United States Patent
Parker et al.

[11] Patent Number: 5,916,669
[45] Date of Patent: Jun. 29, 1999

[54] ENHANCED ABRASION RESISTANCE RADIATION CURABLE COATING FOR SUBSTRATES

[75] Inventors: Theodore L. Parker, Danville; David S. Soane, Piedmont; Nam Thanh Le; Anthony Lam, both of San Jose, all of Calif.

[73] Assignee: 2C Optics, Inc., Alpharetta, Ga.

[21] Appl. No.: 08/777,009

[22] Filed: Jan. 7, 1997

Related U.S. Application Data

[63] Continuation of application No. 08/336,969, Nov. 10, 1994, abandoned.

[51] Int. Cl.$^6$ ................................ B32B 7/02; B32B 27/30
[52] U.S. Cl. .................... 428/216; 428/213; 428/215; 428/217; 428/412; 428/423.3; 428/424.4; 428/520; 428/522
[58] Field of Search ...................... 428/213, 215, 428/216, 217, 423.3, 412, 424.4, 520, 522

[56] References Cited

U.S. PATENT DOCUMENTS

| | | | |
|---|---|---|---|
| 3,673,055 | 6/1972 | Sheld | 428/412 |
| 3,763,290 | 10/1973 | Sheld | 264/1.7 |
| 3,968,309 | 7/1976 | Matsuo et al. | 428/409 |
| 4,084,021 | 4/1978 | Sandvig | 427/44 |
| 4,199,421 | 4/1980 | Kamada et al. | 204/159.22 |
| 4,291,097 | 9/1981 | Kamada et al | 428/412 |
| 4,351,881 | 9/1982 | Kamada et al. | 428/412 |
| 4,550,059 | 10/1985 | Dalton et al. | 428/409 |
| 4,954,591 | 9/1990 | Bellmares | 526/264 |
| 5,114,783 | 5/1992 | Hodnett, III | 428/217 |
| 5,146,531 | 9/1992 | Shustack | 385/128 |
| 5,246,728 | 9/1993 | Rodriquez | 427/2 |
| 5,254,395 | 10/1993 | Hodnett, III | 428/217 |

FOREIGN PATENT DOCUMENTS

0 140 415 Al   8/1985   European Pat. Off. ........ C03C 25/02

*Primary Examiner*—D. S. Nakarani
*Attorney, Agent, or Firm*—Needle & Rosenberg, P.C.

[57] ABSTRACT

An abrasion resistant, radiation or heat curable dual composition is applied to a polymer substrate, such as an opthamlic lens. An abrasion enhancement layer is deposited on a surface of the substrate. The abrasion enhancement layer has a modulus of $M_1$ and a Shore A value of 50 or less. A top coating is deposited on the abrasion enhancement layer. It has a modulus of $M_2$ that is greater than $M_1$. The top coating has an abrasion resistance Bayer Haze Gain ratio of 1.0 or greater.

26 Claims, 1 Drawing Sheet

FIGURE 1

ENHANCED ABRASION RESISTANCE RADIATION CURABLE COATING FOR SUBSTRATES

This application is a continuation of application Ser. No. 08/336,969 filed Nov. 10, 1994, now abandoned.

BACKGROUND OF THE INVENTION

1. Field of the Invention

This invention relates generally to radiation or heat curable coating compositions for a variety of articles, particularly plastic ophthalmic lenses, and more particularly to dual coated ophthalmic lenses with high abrasion and scratch resistance.

2. Description of the Related Art

Plastic materials have found increased usage for the construction of a variety of substrates, including but not limited to ophthalmic lenses for eyeglasses, cameras, and optical instruments, due to their light weight, ease of fabrication and relatively low cost. Common lens forming materials include CR-39 (diethyleneglycol bisallyl carbonate) available from PPG Industries, bisphenol A polycarbonate (PC), and poly(methylmethacrylate) (PMMA).

Plastic lens materials have traditionally possessed inferior resistance to scratching, commonly evaluated by rubbing the surface with steel wool; and inferior resistance to abrasion, usually measured by shaking the lens surface under a bed of sand in the Bayer Abrasion Test. The cumulative effect of scratching and abrading the lens surface is to increase the haze in the lens and ultimately to produce a substantially translucent lens incapable of providing a coherent image. Consequently, plastic lens surfaces have required treatment to provide a scratch and/or abrasion resistant layer on the lens surface to increase the field durability of the lens, and retard the development of haze.

With current lens coating formulations, there is a trade off in the desired properties of scratch resistance and abrasion resistance. One is usually sacrificed for the other.

There is a need for a coating formulation for a plastic substrate that does not sacrifice the scratch resistance or the abrasion resistance for the other. It would be desirable to provide a dual coating for a plastic substrate that provides the substrate with scratch and abrasion resistance characteristics that are substantially similar to glass.

SUMMARY

Accordingly, it is an object of the invention to provide a dual layer coating composition for a plastic substrate that increases abrasion resistance of a coating associated with the substrate while maintaining its scratch resistance.

A further object of the invention is to provide a plastic substrate with an abrasion enhancement coating between the substrate, and a second coating with the abrasion enhancement coating that increases the abrasion resistance of the top coating layer without reducing the second coating's scratch resistance.

Yet another object of the invention is to provide a plastic lens with a dual layer coating composition, with a top coat having increased abrasion resistance while maintaining its scratch resistance.

Another object of the invention is to provide a dual layer coating for a plastic substrate which provides the substrate with substantially the same abrasion and scratch resistance characteristics of a glass substrate.

These and other objects of the invention are obtained for an abrasion resistant, dual coating composition for a substrate. An abrasion enhancement coating is applied to a surface of a substrate. A top coating layer is then applied to the abrasion enhancement coating. The top coating layer has a certain scratch resistance value. The abrasion enhancement coating increases the abrasion resistance value of the top coating layer without sacrificing the top coating layer's scratch resistance value, and provides adhesion between the substrate and the top coating layer. The abrasion enhancement coating has a Young's modulus of $M_1$ and a Shore A value of 50 or less. The top coating layer has a Young's modulus of $M_2$ that is greater than $M_1$ and an abrasion resistance Bayer haze gain ratio of 1.0 or greater.

The substrate can be a made of a polymer. For purposes of this disclosure the polymer substrate can include any type of optically clear and colorless materials, clear colored materials, plastics filled with glass or minerals, wood and metal surfaces.

In one embodiment, the abrasion enhancement coating is made of thirty to ninety-five parts of a flexible acrylated oligomer or acrylated oligomer/acrylate monomer blend resin; and five to seventy parts of a monovinyl functional reactive diluent. The top coating layer is made of twenty to seventy parts of alkane polyols, wherein the alkane polyols contain up to about forty eight carbon atoms and average at least three O-[acryloyl(polyalkylene oxide)] chains, wherein each of the polyalkylene oxide chains comprise from one to twenty alkylene oxide groups; and fifteen to seventy five parts of a polyacrylated urethane, wherein the urethane oligomer has a molecular weight of about 2500 or less and an average of at least two acrylate groups.

In another embodiment, the abrasion enhancement coating is made of thirty to eighty parts of a flexible acrylated oligomer or acrylated oligomer/acrylate monomer blend resin; and twenty to seventy parts of a monovinyl functional reactive diluent. The top coating layer is made of twenty to seventy parts of alkane polyols, wherein the alkane polyols contain up to about forty eight carbon atoms and average at least three O-[acryloyl(polyalkylene oxide)] chains, wherein each of the polyalkylene oxide chains comprise from one to twenty alkylene oxide groups; and fifteen to seventy five parts of a polyacrylated urethane, wherein the urethane oligomer has a molecular weight of about 2500 or less and an average of at least two acrylate groups.

In yet another embodiment of the invention the abrasion enhancement coating is made of thirty to eighty parts of a flexible acrylated oligomer or acrylated oligomer/acrylate monomer blend resin; twenty to seventy parts of a monovinyl functional reaction diluent; optionally, five to thirty parts of polyacryloylated alkane polyols, wherein the alkane polyols contain up to about twenty four carbon atoms and an average of at least two O-acryloyl groups; optionally five to thirty parts of alkane polyols, wherein the alkane polyols contain up to about forty eight carbon atoms and average at least three O-[acryloyl(polyalkylene oxide)] chains, wherein each of the polyalkylene oxide chains comprise from one to twenty alkylene oxide groups; optionally, fifteen to seventy five parts of a polyacrylated urethane, wherein the urethane oligomer has a molecular weight of about 2500 or less and an average of at least two acrylate groups; and optionally, one tenth to fifteen parts of a non-vinyl functional plasticizer.

In a further embodiment, the top coating layer is made of twenty to seventy parts of alkane polyols, wherein the alkane polyols contain up to about forty eight carbon atoms and average at least three O-[acryloyl(polyalkylene oxide)] chains, wherein each of the polyalkylene oxide chains comprise from one to twenty alkylene oxide groups; fifteen to seventy five parts of a polyacrylated urethane, wherein the urethane oligomer has a molecular weight of about 2500 or less and an average of at least two acrylate groups; optionally, twenty to seventy parts of polyacryloylated alkane polyols, wherein the alkane polyols contain up to twenty four carbon atoms and an average of at least three O-acryloyl groups; and optionally, one to twenty five parts of a mono vinyl functional reactive diluent.

The compositions of the invention can include a photoinitiator, a surfactant, a flow control agent, and a stabilizer.

DESCRIPTION OF THE PREFERRED EMBODIMENTS

Figure 1:
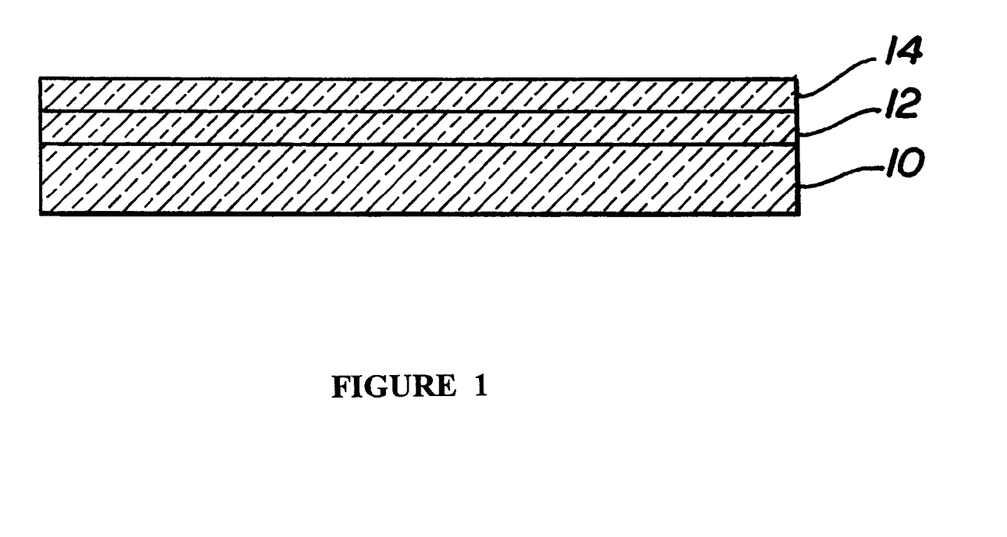
FIG. 1 is cross-sectional view of a substrate with an abrasion enhancement coating and a top coating layer.

Referring now to FIG. 1 a substrate 10, which can be made of a polymer, is first coated with a compliant abrasion enhancement layer 12, followed by a scratch and abrasion resistant top layer 14. Substrate 10 can be a lens, including but not limited to lenses useful as eyeglasses, camera lens components, scientific and medical instrumentation, automotive and aerospace light transmitting components, and the like. Layers 12 and 14 are applied in the liquid state, and then cured by exposure to ultraviolet actinic radiation or by the application of heat to obtain the desired final composite layer properties. It will be appreciated that layers 12 and 14 are applied in the liquid states, with viscosities of about 5 to 5,000 centipoise Tables I and II list different suitable abrasion enhancement coatings 12 and top coatings 14 respectively.

Inclusion of layer 12, with a lower modulus than layer 14, enhances the scratch and abrasion resistance of top coating layer 14. Top coating layer 14 can be tintable. The scratch and abrasion resistance properties of top coating layer 14 can approximate those of glass as illustrated in Table III. Table III is a listing of the abrasion resistance Bayer Haze Gain ratio, scratch resistance (steel wool percent of Haze Gain) and cross-hatch tape peel adhesion for a variety of different dual layer coatings.

Table IV lists different hardness characteristics of abrasion enhancing layer. Table V lists different hardness characteristics of top coating layer 14. Abrasion enhancement layer 12 has a number of desirable properties:

1. It adheres well to both the substrate, e.g., the lens, and top coating 14, and provides a substantial durable bond.
2. Abrasion enhancement layer 12 is compliant to top coating layer 14 and is a "soft" material relative to the harder top coating layer 14. The general physical characteristics of abrasion enhancement layer 12 are those of a compliant material. A degree of cross-linking is desirable for the performance of the abrasion enhancement layer 12, including resistance to creep.
3. Abrasion enhancement layer 12 can be solvent-borne, but is preferably a 100% solids system that can be applied as a liquid, such as by spray or spin

TABLE I

EXAMPLE COMPOSITIONS FOR ABRASION ENHANCING LAYER

COMPOSITION OF ABRASION ENHANCING LAYER FORMULATION, IN PERCENT BY WEIGHT

|       | A1 Eb767 | A2 DSM 3471 1-135 | A3 SR 9008 | A4 SR 9013 | AE1 SR 344 | AOA1 SR 9035 | RD1 SR 285 | RD2 SR 256 | RD3 SR 395 | RD4 H8061 | RD5 SR 493 | RD6 Eb BCEA | UA1 H6008 | UA2 H6210 | P1 DOP |
|-------|------|------|------|------|------|------|------|------|------|------|------|------|------|------|------|
| AEL01 | 50   |      |      |      |      |      | 50   |      |      |      |      |      |      |      |      |
| AEL02 | 50   |      | 25   |      |      |      | 25   |      |      |      |      |      |      |      |      |
| AEL03 | 55   |      |      |      |      |      | 45   |      |      |      |      |      |      |      |      |
| AEL04 | 50   |      |      |      | 25   |      | 25   |      |      |      |      |      |      |      |      |
| AEL05 | 50   |      |      |      |      | 25   | 25   |      |      |      |      |      |      |      |      |
| AEL08 | 60   |      |      |      |      |      | 40   |      |      |      |      |      |      |      |      |
| AEL09 |      | 80   |      |      |      |      | 20   |      |      |      |      |      |      |      |      |
| AEL10 |      | 75   |      |      |      |      | 15   |      |      |      |      |      |      | 10   |      |
| AEL11 | 50   |      |      |      |      | 20   | 30   |      |      |      |      |      |      |      |      |
| AEL12 | 40   |      |      |      |      |      | 60   |      |      |      |      |      |      |      |      |
| AEL13 | 45   |      |      |      |      |      | 55   |      |      |      |      |      |      |      |      |
| AEL19 | 65   |      |      |      |      |      | 35   |      |      |      |      |      |      |      |      |
| AEL20 | 70   |      |      |      |      |      | 30   |      |      |      |      |      |      |      |      |
| AEL21 | 50   |      |      |      |      | 10   | 40   |      |      |      |      |      |      |      |      |
| AEL22 |      | 70   |      |      |      | 10   | 20   |      |      |      |      |      |      |      |      |
| AEL23 | 10   | 80   |      |      |      | 5    | 5    |      |      |      |      |      |      |      |      |
| AEL24 | 38.8 | 38.8 |      |      |      |      | 22.4 |      |      |      |      |      |      |      |      |
| AEL25 |      |      | 3    | 97   |      |      |      |      |      |      |      |      |      |      |      |
| AEL26 |      |      | 3    | 50   |      |      | 47   |      |      |      |      |      |      |      |      |
| AEL27 | 40   |      | 3    | 57   |      |      |      |      |      |      |      |      |      |      |      |
| AEL28 | 40   |      | 3    | 27   |      |      |      |      |      |      |      | 30   |      |      |      |
| AEL29 | 50   |      |      |      |      | 10   |      |      |      | 40   |      |      |      |      |      |
| AEL30 | 50   |      |      |      |      | 5    |      |      |      |      | 45   |      |      |      |      |
| AEL31 |      | 100  |      |      |      |      |      |      |      |      |      |      |      |      |      |
| AEL32 |      | 60   |      |      |      | 10   |      | 30   |      |      |      |      |      |      |      |
| AEL33 |      | 50   |      |      |      | 10   |      | 40   |      |      |      |      |      |      |      |
| AEL34 |      |      |      |      |      | 10   |      | 50   |      |      |      |      |      | 40   |      |
| AEL35 |      |      |      |      |      | 5    |      | 35   |      |      |      |      |      |      | 60   |
| AEL36 | 40   |      |      |      |      | 10   | 10   |      |      |      |      | 40   |      |      |      |
| AEL37 | 20   | 40   |      |      |      |      |      |      |      |      |      |      | 40   |      |      |

TABLE I-continued

| | | | | | | | | | |
|---|---|---|---|---|---|---|---|---|---|
| AEL38 | 20 | 40 | | 5 | 20 | 15 | | | |
| AEL39 | 10 | 50 | | 5 | 20 | 15 | | | |
| AEL40 | 20 | 45 | | 5 | 20 | 10 | | | |
| AEL41 | 20 | 50 | | 5 | 25 | | | | |
| AEL42 | 40 | 20 | | 5 | 35 | | | | |
| AEL43 | 40 | 10 | | 5 | 20 | 25 | | | |
| AEL44 | 50 | | | 5 | 20 | 25 | | | |
| AEL45 | 50 | | | 10 | 20 | 20 | | | |
| AEL46 | 35 | 35 | | | 30 | | | | |
| AEL47 | 40 | 20 | | | 40 | | | | |
| AEL48 | 50 | 20 | | 5 | 25 | | | | |
| AEL49 | 50 | 10 | | 5 | 35 | | | | |
| AEL50 | 30 | 30 | | 5 | 35 | | | | |
| AEL51 | 30 | 40 | | 5 | 25 | | | | |
| AEL52 | 50 | | | 5 | 35 | | | | 10 |
| AEL53 | 45 | 15 | | 5 | 35 | | | | |
| AEL54 | 45 | 10 | | 5 | 40 | | | | |
| AEL55 | 55 | | | | 25 | | 20 | | |
| AEL56 | 45 | 25 | | | 30 | | | | |
| AEL57 | 50 | | | | 40 | | | | 10 |
| AEL58 | 50 | | | | 35 | | | | 15 |
| AEL59 | 40 | 25 | | | 35 | | | | |
| AEL60 | 50 | | 10 | | 40 | | | | |

| Prefix | Class of Composition |
|---|---|
| A | FLEXIBLE OLIGOMER OR OLIGOMER/MONOMER BLEND |
| AE | ACRYLATE ESTER |
| AOA | ALKOXYL ACRYLATE |
| RD | REACTIVE DILUENT |
| UA | URETHANE ACRYLATE |
| P | PLASTICIZER |

Numeric suffixes designate distinct species of the class of composition designated by prefix.

LEGEND FOR TABLE I

| Component | Supplier | Composition |
|---|---|---|
| A = flexible oligomer component | | |
| A1 = Eb 767 | UCB Chemicals Corp., Radcure Business Unit 2000 Lake Park Dr., Smyrna, GA 30080 | 60% polyurethane acrylate, 38% isobornylacrylate, 2% TMPTA |
| A2 = DSM 3471-1-135 | DSM Desotech, Inc., 1122 St. Charles St. Elgin, IL 60120 | polyacrylate ester coating resin |
| A3 = SR 9008 | Sartomer Company, Inc., Oakland Corporate Ctr. 502 Thomas Jones Way, Exton, PA 19341 (Sartomer) | alkoxylated trifunctional acrylate ester resin |
| A4 = SR 9013 | (Sartomer) | mono functional acrylate ester resin |
| AE = acrylic ester component | | |
| AE1 = SR 344 | (Sartomer) | poly(ethylene glycol) diacrylate ester, 400 MW |
| AOA = alkoxylated acrylic ester component | | |
| AOA1 = SR 9035 | (Sartomer) | 15 moles ethoxylated trimethylolpropane triacrylate ester |
| RD - reactive diluent component | | |
| RD1 = SR 285 | (Sartomer) | tetrahydrofurfuryl acrylate |
| RD2 = SR 256 | (Sartomer) | 2-(2-ethoxyethoxy)ethyl acrylate |
| RD3 = SR 395 | (Sartomer) | iso dodecyl acrylate |
| RD4 = H 8061 | Henkel Corporation, Coating Chemicals 300 Brookside Ave., Ambler, PA 19003-3491 (Henkel) | polyester polyacrylate ester resin |
| RD5 = SR 493 | (Sartomer) | tridecyl methacrylate |
| RD6 = BCEA | (Radcure) | β-carboxyethyl acrylate |
| UA = urethane acrylate component | | |
| UA1 = H 6008 | (Henkel) | polyurethane acrylate resin |
| UA2 = H 6210 | (Henkel) | aliphatic polyurethane polyacrylate |
| P = plasticizer component | | |
| P1 = DOP | Eastman Chemical Company Kingsport, TN 37662 | dioctyl phthalate |

TABLE II

EXAMPLE COMPOSITIONS FOR TOPCOATS

COMPOSITION OF TOPCOAT FORMULATION, IN PERCENT BY WEIGHT

| | UA1 Eb 220 | UA2 Eb 6602 | UA3 H 6210 | AE1 SR 9041 | AE2 SR 454 | AOA1 SR 9035 | AOA2 SR 415 | AOA3 SR 499 | AOA4 SR 502 | AOA5 SR 9008 | RD1 SR 497 | RD2 SR 256 | RD3 SR 285 |
|---|---|---|---|---|---|---|---|---|---|---|---|---|---|
| TC 01 | 50 | | | 25 | | | | | | 25 | | | |
| TC 02 | | 50 | | 25 | | | | | | 25 | | | |
| TC 03 | 30 | | | 30 | | | | 15 | 25 | | | | |
| TC 03A | 28.5 | | 5 | 28.5 | | | | 14.2 | 23.8 | | | | |
| TC 03B | 27 | | 10 | 27 | | | | 13.5 | 22.5 | | | | |
| TC 03C | 28.5 | | | 28.5 | | | | 14.2 | 23.8 | | 5 | | |
| TC 03D | 27 | | | 27 | | | | 13.5 | 22.5 | | 10 | | |
| TC 04 | | 30 | | 30 | | | | 15 | 25 | | | | |
| TC 05 | 15 | | | 15 | | 50 | | | | 20 | | | |
| TC 06 | 15 | | | 15 | | 45 | | | | 25 | | | |
| TC 07 | 30 | | | | | 50 | | | | 20 | | | |
| TC 08 | 30 | | | | | 45 | | | | 25 | | | |
| TC 09 | 35 | | | | | 45 | | | | 20 | | | |
| TC 11 | 45 | | | | | 55 | | | | | | | |
| TC 12 | 50 | | | | | 50 | | | | | | | |
| TC 13 | 50 | | | | | | 50 | | | | | | |
| TC 14 | 60 | | | | | | 40 | | | | | | |
| TC 15 | 60 | | | | | | | 15 | 25 | | | | |
| TC 16 | 60 | | | | | 40 | | | | | | | |
| TC 17 | 65 | | | | | 35 | | | | | | | |
| TC 18 | 56.5 | | | | | 43.5 | | | | | | | |
| TC 19 | 30 | | | 30 | | 40 | | | | | | | |
| TC 20 | 30 | | | 25 | | | | 20 | 25 | | | | |
| TC 21 | 25 | | | 25 | | | | 25 | 25 | | | | |
| TC 22 | 30 | | | 30 | | | | | 40 | | | | |
| TC 23 | 70 | | 20 | | | | | | | | | | 10 |
| TC 24 | 40 | | 15 | 35 | | | | | | | | | 10 |
| TC 25 | 45 | | 15 | 25 | | | | | | | | | 15 |
| TC 26 | 50 | | | 30 | | | | | | | | | 20 |
| TC 27 | 55 | | | | | 45 | | | | | | | |
| TC 28 | 40 | | | | 35 | | | 25 | | | | | |
| TC 29 | 30 | | | 25 | 25 | | | 20 | | | | | |
| TC 30 | 40 | | | | 60 | | | | | | | | |
| TC 31 | 30 | | | 30 | 40 | | | | | | | | |
| TC 32 | 40 | | | | | | | 55 | | | 5 | | |
| TC 33 | 75 | | | | | | | | | | 25 | | |
| TC 34 | 30 | | | 25 | | | | 30 | 15 | | | | |
| TC 35 | 30 | | | 30 | | | | 40 | | | | | |
| TC 36 | 30 | | | 25 | | | | 35 | 10 | | | | |
| TC 37 | 30 | | | 25 | | | | 45 | | | | | |
| TC 38 | 30 | | | 35 | | | | 25 | | | | 10 | |
| TC 39 | 30 | | | 35 | | | | 25 | | | | | 10 |
| TC 40 | 30 | | | 30 | | | | 25 | | | | | 15 |
| TC 41 | | | 20 | 60 | | | | | | | | 20 | |
| TC 42 | 45 | | 25 | | | | | | | | | 30 | |
| TC 43 | 30 | | | 30 | | | | 20 | | | | | 20 |
| TC 44 | 30 | | | 30 | | | | 15 | | | 25 | | |
| TC 45 | 30 | | | 30 | | | | 30 | | | | | 10 |

Prefix    Class of Composition

UA    URETHANE ACRYLATE
AE    ACRYLATE ESTER
AOA    ALKOXYL ACRYLATE
RD    REACTIVE DILUENT Numeric suffixes designate distinct species of the class of composition designated by prefix.

LEGEND FOR TABLE II

| Component | Supplier | Composition |
|---|---|---|
| A = flexible oligomer component | | |
| A = Eb 767 | UCB Chemicals Corp., Radcure Business Unit 2000 Lake Park Dr., Smyrna, GA 30080 | 60% polyurethane acrylate, 38% Isobornylacrylate, 2% TMPTA |
| A2 = DSM 3471-1-135 | DSM Desotech, Inc., 1122 St. Charles St. Elgin, IL 60120 | polyacrylate ester coating resin |
| A3 = SR 9008 | Sartomer Company, Inc., Oaklands Corporate Ctr. 502 Thomas Jones Way, Exton, PA 19341 | alkoxylated trifunctional acrylate ester resin |
| A4 = SR 9013 | (Sartomer) | monofunctional acrylate ester resin |
| AE = acrylic ester component | | |
| AE1 = SR 9041 | (Sartomer) | pentaacrylate ester |

TABLE II-continued

| | | | |
|---|---|---|---|
| AE2 = SR 454 | (Sartomer) | | 3 moles ethoxylated trimethylolpropane triacrylate ester |
| AOA = alkoxylated acrylic ester component | | | |
| AOA1 = SR 9035 | (Sartomer) | | 15 moles ethoxylated trimethylolpropane triacrylate ester |
| AOA2 = SR 415 | (Sartomer) | | 20 moles ethoxylated trimethylolpropane triacrylate ester |
| AOA3 = SR 499 | (Sartomer) | | 6 moles ethoxylated trimethylolpropane triacrylate ester |
| AOA4 = SR 502 | (Sartomer) | | 9 moles ethoxylated trimethylolpropane triacrylate ester |
| AOA5 = SR 285 | (Sartomer) | | alkoxylated trifunctional acrylate ester resin |
| RD - reactive diluent component | | | |
| RD1 = SR 497 | (Sartomer) | | N-vinylformamide |
| RD2 = SR 256 | (Sartomer) | | 2-(2-ethoxyethoxy)ethyl acrylate |
| RD3 = SR 285 | (Sartomer) | | Tetrahydrofurfuryl acrylate |
| UA = urethane acrylate component | | | |
| UA1 = Eb 220 | (Radcure) | | aromatic polyurethane polyacrylate (6) |
| UA2 = Eb 6602 | (Radcure) | | aromatic polyurethane polyacrylate (3) |
| UA3 = H 6210 | Henkel Corporation, Coating Chemicals 300 Brookside Ave., Ambler, PA 19003-3491 | | aliphatic polyurethane polyacrylate |

TABLE III

EFFECT of ABRASION ENHANCING LAYER on ABRASION and SCRATCH RESISTANCE of TOPCOATS

| Substrate | AEL Reference # | TC Reference # | Abrasion Resistance Bayer Haze Gain Ratio | Scratch Resistance Steel Wool % Haze Gain | Cross-Hatch Tape Peel Adhesion |
|---|---|---|---|---|---|
| Polycarbonate | None | TC 45 | 1.53 | 0 | PASS |
| " | AEL12 | TC 45 | 1.67 | | PASS |
| " | AEL52 | TC 45 | 1.72 | 0.02 | PASS |
| " | AEL54 | TC 45 | 1.75 | 0 | PASS |
| " | AEL53 | TC 45 | 1.75 | 0.02 | PASS |
| " | AEL37 | TC 45 | 1.78 | | PASS |
| " | AEL47 | TC 45 | 1.8 | | PASS |
| " | AEL60 | TC 45 | 1.95 | 0 | PASS |
| " | AEL57 | TC 45 | 1.98 | 0 | PASS |
| " | AEL56 | TC 45 | 1.99 | 0.5 | PASS |
| " | AEL61 | TC 45 | 2.20 | | FAIL |
| " | AEL62 | TC 45 | 2.60 | | FAIL |
| " | AEL63 | — | | | CRAZED |
| CR-39 | None | TC 11 | 1.6 | 1.4 | PASS |
| " | AEL03 | TC 11 | 2.1 | 1.5 | PASS |
| " | AEL01 | TC 11 | 2.3 | 0.9 | PASS |
| Polycarbonate | None | TC 03 | 1.4 | 0 | PASS |
| " | AEL03 | TC 03 | 2 | 0 | PASS |
| " | AEL24 | TC 03 | 2.3 | 0 | PASS |
| CR-39 | AEL03 | TC 14 | 1.8 | | FAIL |
| " | AEL03 | TC 23 | 1.8 | 0.1 | PASS |
| " | AEL03 | TC 13 | 2.1 | 0.8 | PASS |
| " | AEL03 | TC 11 | 2.5 | 1.3 | PASS |
| " | AEL03 | TC 20 | 2.2 | 0.1 | PASS |
| Polycarbonate | AEL31 | TC 30 | 1.98 | 2.2 | PASS |
| " | AEL31 | TC 03 | 2.09 | | FAIL |
| " | AEL31 | TC 32 | 2.8 | 8.3 | PASS |
| CR-39 | None | None | 1 | 53 | — |
| Polycarbonate | None | None | <0.2 | >60 | — |
| Crown Glass | None | None | 3 | 0 | — |

TABLE IV

HARDNESS CHARACTERISTICS of ABRASION ENHANCING LAYER (AEL)

| AEL Reference # | Shore A Durometer | Shore D Durometer |
|---|---|---|
| AEL01 | 9.0 | |
| AEL03 | 7.0 | <0.5 |
| AEL09 | 42.0 | 9.0 |
| AEL12 | 11.0 | |
| AEL22 | 57.0 | 19.0 |
| AEL24 | 43.0 | 8.5 |
| AEL31 | 51.5 | 16.0 |
| AEL37 | 35.0 | 7.0 |
| AEL41 | 51.5 | 18.0 |
| AEL47 | 24.0 | |
| AEL52 | 24.5 | |
| AEL53 | 36.5 | |
| AEL54 | 30.0 | |
| AEL56 | 33.0 | 8.0 |
| AEL57 | 8.0 | |
| AEL60 | 32.5 | <0.5 |
| AEL63 | 52.5 | 16.0 |

TABLE V

HARDNESS CHARACTERISTICS OF TOPCOAT LAYERS

| Topcoat Reference # | Shore D Durometer |
|---|---|
| TC03 | 91 |
| TC11 | 80 |
| TC17 | 90 |
| TC18 | 89 |
| TC24 | 92 |
| TC25 | 90 |
| TC26 | 95 |
| TC27 | 89 |
| TC45 | 91 |
| TC46 | 82 | coating techniques, and is convertible to its desired final physical state by exposure to an energy source, preferably ultraviolet actinic radiation, although thermal curing to the desired final physical state is possible. Free radical based curing regimens are preferred, but cationic or catalyzed curing systems can be used.

4. Abrasion enhancement layer 12 is resistant to environmental degradation, including but not limited to exposure to temperature, humidity or sunlight, and is also durable. The operational temperature range is at least 20 degrees C. to 50 degrees C.

Without being bound by any specific explanation for the observed benefit effects of abrasion enhancement layer 12, it is believed that abrasion enhancement layer 12 allows the deformation of top coating layer 14 when it is contacted by rough objects. This deformation allows the transfer of the frictional and impact energy from top coating 14 to abrasion enhancement layer 12 where it can be absorbed and dissipated. Top coating layer 14, which is innately more brittle than abrasion enhancement layer 12, does not reach the critical tensional and compressional threshold where cracks can form that scatter light, and give a hazy appearance. While the steel wool resistance of a coating is believed to be mostly related to the hardness of the coating, the Bayer abrasion resistance is believed to be more related to the ability of a coating to endure impact without chipping or cracking. Additionally, in the prior art, a single coating layer is tightly bonded directly to the lens surface and a considerable internal stress remains in the coating after curing, particularly in the x and y directions. With the present invention, abrasion enhancement layer 12 is bonded to the substrate; the residual stress in top coating layer 14 from that curing process is greatly reduced or eliminated altogether, and top coating layer 14 becomes more notch insensitive relative to the traditional single coating layer approach.

Substrate 10 has abrasion enhancement layer 12 deposited on a surface of the substrate. Abrasion enhancement layer 12 has a Young's modulus of $M_1$ and a Shore A value of 50 or less. Top coating layer 14 is deposited on abrasion enhancement layer 12. Top coating layer 14 has a Young's modulous of $M_2$ that is greater than $M_1$ and an abrasion resistance Bayer haze gain ratio of 1.0 or greater. Top coating layer 14 has a Shore D value of 50 or higher, and a steel wool % haze gain of 10 or lower. The thicknesses of abrasion enhancement layer 12 and top coating layer 14 can vary and be independent. Preferable thicknesses are 2–50 microns, more preferably 5–20 microns for each layer. In one embodiment, layers 12 and 14 are about 15 microns or less.

Abrasion enhancement layer 12 can have the following composition:

I. Thirty to ninety five parts of a flexible acrylated oligomer or acrylated oligomer/acrylate monomer blend resin (A);

II. Five to seventy parts of a mono vinyl functional reactive diluent (RD); and

III. Optionally, five to thirty parts of alkane polyols, wherein the alkane polyols contain up to about twenty four carbons atoms and an average of at least two O-acryloyl groups (AE);

IV. Optionally, five to thirty parts of alkane polyols, wherein the alkane polyols contain up to about forty eight carbon atoms and average at least three O-[acryloyl(polyalkylene oxide)] chains; wherein each of the polyalkylene oxide chains comprise from one to twenty alkylene oxide groups (AOA);

V. Optionally, fifteen to seventy five parts of polyacrylated urethane, wherein the urethane oligomer has a molecular weight of about 2500 or less and an average of at least two acrylate groups (UA); and VI. Optionally, one tenth to fifteen parts of a non-vinyl functional plasticizer (P), such that the cured abrasion enhancing layer is softer than the cured top coat layer This composition can also contain a photoinitiating amount of a photoinitiator, typical one tenth to about ten parts, as well as optional surfactants and stabilizers.

Additionally, abrasion enhancement layer 12 can have the following composition:

I. Thirty to eighty parts of a flexible acrylated oligomer or acrylated oligomer/acrylate monomer blend resin (A); and II. Twenty to seventy parts of a mono vinyl functional reactive diluent (RD). a Top coating layer 14 can have the following composition:

I. Twenty to seventy parts of alkane polyols, wherein the alkane polyols contain up to about forty eight carbon atoms and average at least three O-[acryloyl(polyalkylene oxide)] chains; where in each of the polyalkylene oxide chains comprise from one to twenty alkylene oxide groups (AOA);

II. Fifteen to seventy five parts of a polyacrylated urethane, wherein the urethane oligomer has a molecular weight of about 2500 or less and average of at least two acrylate groups (UA);

III. Optionally, twenty to seventy parts of polyacryloylated alkane polyols, wherein the alkane polyols contain up to twenty four carbon atoms and an average of at least three O-acryloyl groups (AE);

IV. Optionally, one to twenty five parts of a mono vinyl functional reactive diluent (RD).

This dual composition can also contain a photoinitiating amount of photoinitiator, typically one tenth to about ten parts, as well as optional surfactants and stabilizers.

Another class of a scratch and abrasion-resistant, radiation curable or heat curable coating composition used in accordance with the present invention comprises:

I. Ten to fifty parts of polyacryloylated alkane polyols, wherein the alkane polyols contain up to about twenty four carbon atoms and an average of at least three O-acryloyl groups (AE);

II. Twenty to eighty parts of alkane polyols, wherein the alkane polyols contain up to about forty eight carbon atoms and average at least three O-[acryloyl (polyalkylene oxide)] chains; wherein each of the polyalkylene oxide chains comprise from one to twenty alkylene oxide groups (AOA);

This composition will also contain a photoinitiating amount of a photoinitiator, typically one tenth to about ten parts, as well as optional surfactants and stabilizers.

COMMERCIAL EXAMPLES OF COMPOSITION COMPONENTS

"A" (FLEXIBLE ACRYLATED OLIGOMER OR OLIGOMER/MONOMER BLEND RESIN MATERIAL,) EXAMPLES

Examples of suitable flexible oligomer or oligomer/monomer blend materials are Sartomer CN 300, Sartomer9008, Sartomer 9013; Radcure Ebecryl 3600, Ebecryl 3703, Ebecryl 270, Ebecryl 4830, Ebecryl 4834, Ebecryl 4881, Ebecryl 4883, Ebecryl 8402, Ebecryl 525, Ebecryl 585, Ebecryl 745, Ebecryl 754, Ebecryl 767, Ebecryl 1755; Henkel Photomer 6230; DSM Desotech 3471-1-135.

"RD" (REACTIVE DILUENTS) EXAMPLES

Examples of suitable mono vinyl functional reactive diluents are Sartomer SR 203, SR 232, SR 244, SR 256, SR 285, SR 339, SR 395, SR 440, SR 493, SR 497, SR 506; Radcure IBOA, Radcure ODA, Radcure B-CEA; Henkel Photomer 4039, Photomer 4812, Photomer 4816, Photomer 4822, Photomer 8061 and Photomer 8127.

"AE" (ACRYLATE ESTER) EXAMPLES FOR ABRASION ENHANCEMENT LAYER 12:

Examples of suitable two functional acrylated aliphatic polyol esters are Sartomer SR 205, SR 209, SR 210, SR 230, SR 231, SR 252, SR 259, SR 268, SR 272, SR 306, SR 344, SR 9003, SR 9209; Radcure TRPGDA, Radcure HDODA; Henkel Photomer 4050, Photomer 4065, Photomer 4061, Photomer 4126, Photomer 4127, Photomer 4160, Photomer 4193, and Photomer 4204. Examples of three or greater functional acrylated aliphatic polyol ester are Sartomer SR 350, SR 351, SR 444, SR 295, SR 335, SR 399, SR 9041; Radcure DPHPA, Radcure PETA K,. Radcure TMPTA; Henkel Photomer 4006, Photomer 4335, and Photomer 4399.

A general chemical structure may be written:

where n≧2

"AOA" EXAMPLES

Examples of alkoxylated acrylates are Sartomer SR 415, SR 454, SR 492, SR 499, SR 502, SR 9008, SR 9035; Radcure OTA-480, Radcure TMPTEOA, Radcure Ebecryl 53; Henkel Photomer 4072, Photomer 4094, Photomer 4095, Photomer 4149, Photomer 4155, Photomer 4158, and Photomer 4355.

A general chemical structure may be written:

where p≧3
m=1–20
s=1–6
R is H or lower alkyl, preferable H or methyl

"UA" (ACRYLATED URETHANE) EXAMPLES

Examples of urethane acrylates are Sartomer CN 953, CN 961, CN 963, CN 964, CN 970, CN 971, CN 972, CN 975, CN 980; Radcure Ebecryl 8804, Ebecryl 220, Ebecryl 6602, Henkel Photomer 6210, Photomer 6008, Photomer 6010.

"P" (PLASTICIZER) EXAMPLES

Examples of plasticizers are the aliphatic or arakyl esters of aromatic acids, diacids, and triacids, (such as benzoic, phthalic, isophthalic, terephthalic, and trimellitic acids) such as dioctyl phthalate (DOP) and dibenzyl phthalate; the aliphatic or aralkyl esters of aliphatic acids (such as adiptic, azelaic, glutaric, and citric acids) such as dioctyl adipate; and phosphate esters.

"AE" (ACRYLATE ESTER) EXAMPLES FOR TOP OATING LAYER 14

Examples of acrylated aliphatic polyol ester which average three or greater acrylic functionality are Sartomer SR 350, SR 351, SR 454, SR 295, SR 355, SR 399, SR 9041; Radcure DPHPA, Radcure PETA K, Radcure TMPTA; Henkel Photomer 4006, Photomer 4355, and 4399.

A general chemical structure may be written:

where n≧3

TEST METHOD DESCRIPTION
BAYER ABRASION RESISTANCE

A Bayer Sand Abrasion Tester is used for the determination of surface abrasion resistance. The sample, dual coated with abrasion enhancing layer and top coat, along with a control sample of CR-39 is cleaned with mild soapy water, rinse with water, then air dried. The light transmission of the both at 550 nm is determined using a Fisher UV-VIS Spectrophotometer (reference ASTMD 1003-61 "Standard Test Method for Measuring Haze and Luminous Transmittance of Transparent Plastics"). The cleaned sample is mounted to cover one of the holes in the underside of the testing pan. The control sample of uncoated CR-39 is place under the other hole, then 1.0 kilograms of new sand, which has been sieved to retain the portion passing a #7 but held by a #14 sieve, is placed in the pan. The sand filled pan is shaken over a 4 inch stroke at a rate of sieve, is placed in the pan. The sand filled pan is shaken over a 4 inch stroke at a rate of 150 cycles per minute for a total of 300 cycles. Both sample and control are cleaned with mild soapy water, rinsed with water, then air dried. The light transmission of the both at 550 nm is determined. The percent haze gain due to abrading the sample surfaces with sand is calculated; the Bayer Haze Gain Ratio is determined by dividing the measured haze gain for the CR-39 control by that of the sample under evaluation. By definition, the Bayer Haze Gain Ratio for CR-39 is 1.0.

SCRATCH RESISTANCE

An Eberbach 6000 Steel Wool Abrasion Tester is used for the determination of surface scratch resistance. A piece of 000 steel wool (Pro's Best, International Steel Wool Co.) is mounted over the end of a one inch by one inch mandrel with the steel wool strands aligned in the direction of motion. The sample, dual coated with abrasion enhancing layer and top coat layer, is cleaned with mild soapy water, rinsed with water, then air dried. The light transmission of the sample at 550 nm is determined using a Fisher UV-VIS Spectrophotometer (reference ASTMD 1003-61 "Standard Test Method for Measuring Haze and Luminous Transmittance of Transparent Plastics"). The cleaned sample is mounted onto the testing stage, then the mandrel set in place and weighted with 32 pounds. Twenty complete cycles back and forth across the sample are applied at a rate of 100 cycles per minute. The sample is re-cleaned with mild soapy water, rinsed with water, then air dried and the light transmission of the sample at 550 nm is determined. The percent hazed gain due to scratching the sample surface with steel wool is calculated by comparison with the value before testing and reported.

CROSS-HATCH TAPE PEEL ADHESION TEST

A sample plastic substrate is coated and cured with the abrasion enhancing layer and topcoat layer under evaluation. A cross-hatched grid of twenty five squares 2 mm on a side is scored through both layers down to the substrate using a razor knife. One end of a three inch by three fourths inch piece of Scotch Tape® (3M Co.) is placed over the grid and pressed to bond uniformly to the topcoat surface. The tape is then peeled off the surface with a rapid hand motion. If no more than one square of the grid is found to have debonded from the substrate an adhered to the tape, the sample configuration is deemed to have passed the adhesion test. If no more than on square debonds, the sample is deemed to have failed the adhesion test. Reference is made to test ASTM D-3359.

HARDNESS EVALUATION OF CURED AEL AND TOP-COAT COMPOSITIONS

The relative hardness of cured AEL and topcoat compositions on the Shore A and/or Shore D scales was determined using a durometer. The neat resin sample was poured into a 1"×1"×⅛" mold cavity formed by a PVC gasket held between two quartz plates. The sample was cured using a Fusion System H Bulb with an exposure time of about 8–12 seconds. Cured samples were removed from the mold, allowed to cool to ambient temperature, then the hardness on the Shore A or D scale determined with the respective Shore Durometer. There is some overlap in the scales, but the A scale can assess the hardness of softer samples, while the D scale is used for relatively harder samples.

DESCRIPTION OF EXAMPLE SAMPLE PREPARATION

SPIN COATING AND UV CURING

A substrate sample, about 3 inches in diameter and ⅛ inch thick, is mounted on the spin table of the spin coating apparatus. While spinning at about 150 rpm, the sample surface is washed with ispropyl alcohol, then the speed increased to 2000–3000 rpm and held until sample surface is dry, about 30–60 seconds. While spinning at about 150 rpm, the abrasion enhancing layer (AEL) is applied with a pipette to the substrate surface, working from the center to the edge of the sample, to form a uniform coating layer. The spin speed is then increased to the range 1000–6000 rpm and held for 15–90 seconds until the desired layer thickness is achieved, generally in the range of 1–50 microns. The wet coated substrate is placed in an enclosed chamber with a quartz window, nitrogen purged through the cavity, then the chamber with sample is passed on a conveyor belt under a Fusion systems UV Lamp to cure the abrasion enhancing layer. Total irradiation time for AEL is 1–10 seconds. The coated sample is returned to the spin table, then the topcoat is applied by pipette across the slowly spinning AEL sample surface. The spin speed is then increased to the range 1000–6000 rpm and held for 15–90 seconds until the desired layer thickness is achieved, generally in the range of 1–50 microns. The wet coated AEL/substrate is placed in the chamber with a quartz window, nitrogen purged through the cavity, then the chamber passed on a conveyor belt under a Fusion Systems UC Lamp to cure the topcoat layer. Total irradiation time for the top coat layer is 1–10 seconds.

What is claimed is:

1. An abrasion resistant article, comprising:
    a plastic substrate;
    an abrasion enhancement layer deposited on a surface of the plastic substrate which adheres to the surface of the plastic substrate, the abrasion enhancement layer including an acrylated oligomer or acrylated oligomer/acrylate monomer blend resin; and
    a top coating layer deposited on the abrasion enhancement layer, the top coating layer including polyacrylated urethane the top coating layer having an abrasion resistance Bayer haze gain ratio of 1.0 or greater and a greater hardness than the abrasion enhancement layer.

2. The abrasion resistant article of claim 1, wherein the top coating layer has a Shore D value of between about 80 and about 95.

3. The abrasion resistant article of claim 1, wherein the top coating layer has a steel wool percent haze gain of 10 or less.

4. The abrasion resistant article of claim 1, wherein the abrasion enhancement layer and the top coating layer each have a thickness of 50 microns or less.

5. The abrasion resistant article of claim 1, wherein the abrasion enhancement layer and the top coating layer each have a thickness of 20 microns or less.

6. The abrasion resistant article of claim 1, wherein the abrasion enhancement layer and the top coating layer each have a thickness of 15 microns or less.

7. The abrasion resistant article of claim 1, wherein the abrasion enhancement layer increases an abrasion resistance of the top coating layer without substantially reducing a scratch resistance of the top coating layer.

8. The abrasion resistant article of claim 1 wherein the plastic substrate is selected from the group consisting of polycarbonate, diethylene glycol bis allyl polycarbonate and polymethylmethyacrylate.

9. An abrasion resistant article, comprising:
    a plastic substrate;
    an abrasion enhancement layer deposited on a surface of the plastic substrate, the abrasion enhancement layer including thirty to ninety five percent by weight of a acrylated oligomer or acrylated oligomer/acrylate monomer blend resin and five to seventy percent by weight of a monovinyl functional reaction diluent; and
    a top coating layer deposited on the abrasion enhancement layer including twenty to seventy percent by weight of alkane polyols, wherein the alkane polyols contain up to about forty eight carbon atoms and average at least three O-[acryloyl(polyalkylene oxide)] chains, wherein each of the polyalkylene oxide chains comprise from one to twenty alkylene oxide groups, and fifteen to seventy five percent by weight of a polyacrylated urethane, wherein the urethane oligomer has a molecular weight of about 2500 or less and an average of at least two acrylate groups.

10. The abrasion resistant article of claim 9, wherein the abrasion enhancement layer includes thirty to eighty percent by weight of a acrylated oligomer or acrylated oligomer/acrylate monomer blend resin and twenty to seventy percent by weight of a monovinyl functional reaction diluent.

11. The abrasion resistant article of claim 9, wherein the abrasion enhancing layer further includes a photoinitiating amount of a photoinitiator responsive to ultraviolet radiation.

12. The abrasion resistant article of claim 9, wherein the top coat layer further includes a photoinitiating amount of a photoinitiator responsive to ultraviolet radiation.

13. The abrasion resistant article of claim 9, wherein the abrasion enhancing layer further includes a surfactant and a stabilizer.

14. The abrasion resistant article of claim 9, wherein the top coat layer further includes a surfactant and a stabilizer.

15. The abrasion resistant article of claim 9, wherein the abrasion enhancing layer further includes a polyol compound or mixture of the formula (Polyol)—(O—CO—CH=CH$_2$)$_n$, wherein n is on average greater than or equal to 2.

16. The abrasion resistant article of claim 9, wherein the alkane polyols is selected from compounds having the general formula (Polyol)—((—O—(CH—R)$_s$—)$_m$—O—CO—CH=CH$_2$)$_p$ where, p is on average greater than or equal to 3, m is between 1 and 20, s is between 1 and 6, and R is H or alkyl.

17. The composition of claim 16, wherein R is H or methyl.

18. The abrasion resistant article of claim 9, wherein the abrasion enhancing layer further includes a polyacrylated urethane selected from compounds having the general formula (Polyol)—(O—CO—CH=CH$_2$)$_n$ wherein n is on average greater or equal to 3.

19. An abrasion resistant article, comprising:
a plastic substrate;
an abrasion enhancement layer deposited on a surface of the plastic substrate, the abrasion enhancement layer including
five to seventy percent by weight of a monovinyl functional reaction diluent, five to thirty percent by weight of polyacryloylated alkane polyols, wherein the alkane polyols contain up to about twenty four carbon atoms and an average of at least two O-acryloyl groups,
five to thirty percent by weight of alkane polyols, where the alkane polyols contain up to about forty eight carbon atoms and average at least three O-[acryloyl (polyalkylene oxide)] chains, wherein each of the polyalkylene oxide chains comprise from one to twenty alkylene oxide groups,
fifteen to seventy five percent by weight of a polyacrylated urethane, wherein the urethane oligomer has a molecular weight of about 2500 or less and an average of at least two acrylate groups, and
one tenth to fifteen percent by weight of a non-vinyl functional plasticizer such that the cured abrasion enhancing layer is softer than the cured topcoat layer; and a top coating layer deposited on the abrasion enhancement layer including
twenty to seventy percent by weight of alkane polyols, wherein the alkane polyols contain up to about forty eight carbon atoms and average at least three O-[acryloyl(polyalkylene oxide)] chains, wherein each of the polyalkylene oxide chains comprise from one to twenty alkylene oxide groups,
fifteen to seventy five percent by weight of a polyacrylated urethane, wherein the urethane oligomer has a molecular weight of about 2500 or less and an average of at least two acrylate groups
twenty to seventy percent by weight of polyacryloylated alkane polyols, wherein the alkane polyols contain up to twenty four carbon atoms and an average of at least three O-acryloyl groups, and
one to twenty five percent by weight of a mono vinyl functional reactive diluent.

20. The abrasion resistant article of claim 19, wherein the abrasion enhancing layer includes thirty to ninety five percent by weight of a acrylated oligomer or acrylated oligomer/acrylate monomer blend resin, and five to seventy percent by weight of a monovinyl functional reaction diluent.

21. The abrasion resistant article of claim 19, wherein the abrasion enhancing layer further includes a surfactant and a stabilizer.

22. The abrasion resistant article of claim 19, wherein the top coat layer further includes a surfactant and a stabilizer.

23. The abrasion resistant article of claim 19, wherein the polyol of the abrasion enhancing layer is a compound or mixture of the formula (Polyol)—(O—CO—CH=CH$_2$)$_n$, wherein n is on average greater than or equal to 2.

24. The abrasion resistant article of claim 19, wherein the alkane polyols is selected from compounds having the general formula (Polyol)—((—O—(CH—R)$_s$—)$_m$—O—CO—CH=CH$_2$)$_p$ where, p is on average greater than or equal to 3, m is between 1 and 20, s is between 1 and 6, and R is H or alkyl.

25. The composition of claim 24, wherein R is H or methyl.

26. The abrasion resistant article of claim 9, wherein the abrasion enhancing layer further includes a polyacrylated urethane selected from compounds having the general formula (Polyol)—(O—CO—CH=CH$_2$)$_n$ wherein n is on average greater or equal to 3.

* * * * *